UNITED STATES PATENT OFFICE.

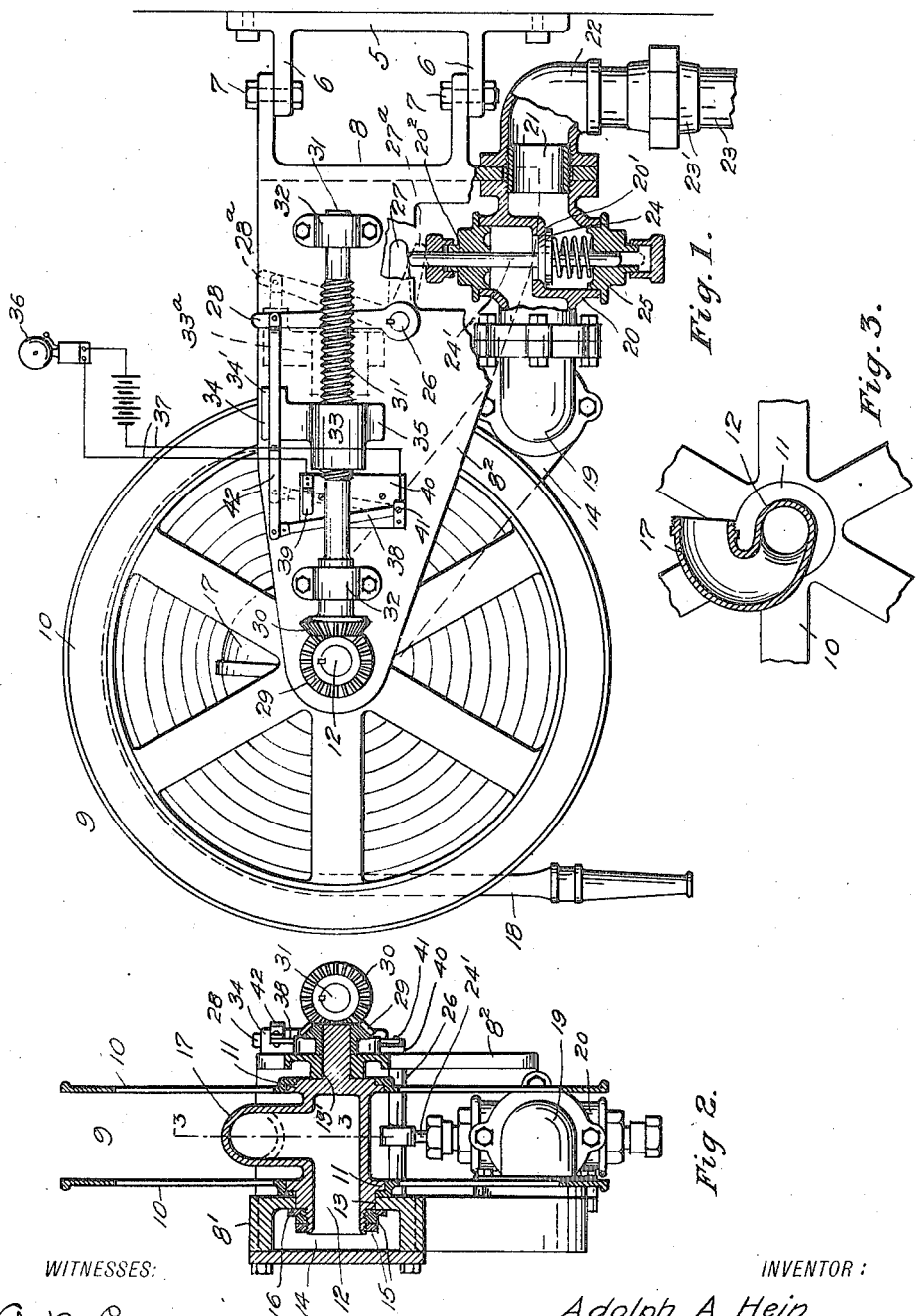

ADOLPH A. HEIN, OF SEATTLE, WASHINGTON.

HOSE-REEL.

1,188,072.

Specification of Letters Patent. Patented June 20, 1916.

Application filed June 2, 1915. Serial No. 31,765.

*To all whom it may concern:*

Be it known that I, ADOLPH A. HEIN, a citizen of the United States, residing at Seattle, in the county of King and State of Washington, have invented certain new and useful Improvements in Hose-Reels, of which the following is a specification.

This invention relates to hose-reels and, more particularly, to improvements in the devices illustrated and described in United States Patent No. 985,029 issued to me February 21, 1911.

The object of my improvements is to simplify and perfect the above referred to patented devices.

The invention consists in the novel construction, adaptation and combination of parts as will be hereinafter described and claimed.

In the accompanying drawings, Figure 1 is a view in side elevation, with certain parts shown in section, of a hose-reel embodying the present invention. Fig. 2 is a transverse vertical section of the same with the hose omitted. Fig. 3 is a detail sectional view taken through 3—3 of Fig. 2.

In the drawings, the reference numeral 5 designates a wall bracket having forwardly projecting arms 6 provided with vertically alined holes to receive bolts 7. These bolts serve as pivotal elements to hingedly support a frame 8 for the hose reel 9 whereby the latter may be swung to one side and against the wall when the hose is unemployed.

The reel is formed with spaced heads or wheel members 10 which are secured to peripheral flanges 11 of a hollow hub 12 which is journaled in bearings 13 and $13^1$ provided in the side members $8^1$ and $8^2$ of said frame and extends into a duct 14 provided in the frame member $8^1$.

15 represents nuts engaging screw threads provided in the end of the hub for securing a packing ring 16 in position to prevent any leakage at the bearing 13.

Intermediate the reel heads 10 the hub is provided with a tubular branch 17 provided with screw threads for making connection with the hose 18.

The duct 14 communicates through an elbow 19 with the outlet opening of a valve body 20 whose inlet end is connected by a nipple 21 and an elbow 22 with a vertically arranged water supply pipe 23 disposed in axial alinement with the bolts 7 which hingedly connect the frame 8 to the aforesaid wall bracket.

Included in the pipe is a joint to enable the upper portion to rotate with the swinging movements of the frame said joint being rendered non-leakable by the use of any suitable stuffing-box connection such, for example, as an ordinary union fitting indicated by $23^1$.

24 represents a valve opening downwardly from its seat $20^1$ provided in said body and in opposition to the power of a helical spring 25 and the water pressure obtaining in the supply pipe. Said valve is fixedly connected to a stem $24^1$ which extends through and for a distance above a stuffing box $20^2$ of the body 20.

Extending transversely through the frame is a shaft 26 having rigidly connected thereto arms 27 and 28 which constitute, in effect, a bellcrank lever whereof the arm 27 engages against the upper end of the valve stem $24^1$, while the other arm, 28, extends upwardly to be influenced by the valve opening mechanism which I will now explain.

Keyed or otherwise secured to the hub 12 is a bevel gear wheel 29 in mesh with a like wheel 30 provided on a horizontal shaft 31 which is rotatable in bearing boxes 32 provided on the frame member $8^2$. This shaft is provided with screw threads $31^1$ which engage internal threads of a nut or block 33 to propel the same away from the axis of the reel when the latter is rotated in the unwinding of the hose, and is retracted when the reel is rotated in the contrary direction to recoil the hose upon the reel. Said block is provided, integral therewith with upwardly and downwardly directed arms 34 and 35 and extending rearwardly from the upper end of the former is a protuberance $34^1$. Included in the invention is an alarm consisting of an electric bell 36 in a circuit, indicated diagrammatically by 37 in Fig. 1, whose terminals are respectively connected to the blade 38 and contact clip 39 of a switch. Such switch elements are mounted upon an insulating base 40 which is rigidly secured to the frame 8. Said blade is fulcrumed to a hinge pin 41 and has its free end coupled by a link 42 to the lever arm 28.

When the hose 18 is unwound from the reel the latter is turned to rotate through the medium of the gear wheels 29 and 30 the screw shaft 31 which causes the nut 33 to be moved rearwardly. In such movement of the nut the arm protuberance 34¹ thereof encounters the lever arm 28 and in the continued travel of the nut the lever arm is swung rearwardly at a relatively slow speed to swing the blade element 38 of the switch into contact with the clip 39 whereupon the electric circuit is closed to effect the ringing of the alarm. As this occurs the lever arm 27 is swung downwardly to depress the stem 24¹ to start the opening of the valve 24 in opposition to the spring 25 and the waterpressure below the valve. By thus opening the valve at a relatively slow speed the application of comparatively little power is requisite to overcome the forces tending to maintain the valve against its seat. When the valve, however, has been opened to a small extent water is admitted above the valve resulting in a static balance between the water pressures at opposite sides of the valve. While this is being accomplished the nut 33 has moved rearwardly causing the lever arm 28 to be gradually swung beyond the reach of the projection 34¹ and thereafter such lever arm is engaged by the nut arm 35 in proximity to the axis of the shaft 26 to accordingly impart during the remainder of the nut's travel, a relatively quick swinging movement to the lever arm 27 and a corresponding opening of the valve to its maximum extent. The ultimate positions of the nut 33, and the lever arms 27 and 28 are respectively indicated by broken lines 33ª, 27ª and 28ª in Fig. 1.

From the foregoing it is apparent that the alarm is rendered operative at or about the time that water is being supplied to a small extent to the hose but previous to the full opening of the valve.

When the reel is turned to rewind the hose upon the same, the nut 33 is withdrawn from the lever arm, then the spring 25 asserts its power to close the valve and restore the lever arm 28 to its full line position in Fig. 1, with a consequent opening of the switch to break the electric circuit.

The invention is of simple and durable construction and the valve is automatically actuated when the hose is unreeled to afford a rapid supply of water in an emergency or otherwise.

What I claim is—

1. The combination with a wall bracket, a water supply pipe, a frame hingedly connected to said bracket, a hose reel having a hollow axle rotatably mounted in said frame, a hose for the reel, a valve supported by the frame and operatively connected with the supply pipe and with the interior of said hub, and a spring tending to retain said valve in closed condition, of a screw shaft, toothed gear connection operatively connecting the reel hub with said shaft to rotate the latter when the reel is rotated, a nut mounted on said screw shaft, and means adapted to be actuated by said nut only during the unwinding of the last few coils of the hose to effect the opening of the valve.

2. In apparatus of the class described, a hose, a reel provided with a hollow hub to which said hose is connected, a frame in which said reel is journaled, a water supply pipe, a valve operatively connected with said pipe and also with the reel hub, devices including an upwardly directed lever arm engageable with the stem of said valve, a screw shaft, means actuated by the rotation of the reel to rotate said screw shaft, a nut mounted upon the screw shaft and adapted when propelled thereby to primarily encounter said lever arm near its free end to impart a relatively slow initial opening movement to said valve and subsequently engage the lever arm adjacent to its fulcrum to accelerate the opening of such valve.

Signed at Seattle, Washington, this 8th day of May, 1915.

ADOLPH A. HEIN.

Witnesses:
  PIERRE BARNES,
  HORACE BARNES.